(12) United States Patent  (10) Patent No.: US 7,077,227 B2
Oliver et al.  (45) Date of Patent: *Jul. 18, 2006

(54) CONTROLLED TRUCK CAB SUSPENSION

(75) Inventors: Michael L. Oliver, Xenia, OH (US); William C. Kruckemeyer, Dayton, OH (US); Eric L. Jensen, Dayton, OH (US); Todd A. Bishop, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/645,685

(22) Filed: Aug. 21, 2003

(65) Prior Publication Data

US 2004/0129468 A1 Jul. 8, 2004

Related U.S. Application Data

(60) Provisional application No. 60/465,146, filed on Apr. 24, 2003, provisional application No. 60/405,136, filed on Aug. 21, 2002.

(51) Int. Cl.
B62D 33/06 (2006.01)

(52) U.S. Cl. .............................. 180/89.12; 280/5.514; 267/64.16; 296/190.01

(58) Field of Classification Search ............ 280/5.507, 280/5.514, 6.15; 180/89.12, 89.13, 89.14; 267/64.16, 64.17, 64.19, 64.26, 64.27; 296/190.6, 296/190.7, 190.01
See application file for complete search history.

(56) References Cited

U.S. PATENT DOCUMENTS

| | | | | |
|---|---|---|---|---|
| 3,966,009 A | * | 6/1976 | Meacock et al. | 180/89.15 |
| 4,468,739 A | * | 8/1984 | Woods et al. | 701/37 |
| 4,871,189 A | * | 10/1989 | Van Breemen | 267/64.27 |
| 4,909,536 A | * | 3/1990 | Hale | 280/6.157 |
| 4,934,667 A | * | 6/1990 | Pees et al. | 267/64.21 |
| 5,014,199 A | * | 5/1991 | Konishi et al. | 701/37 |
| 5,039,072 A | * | 8/1991 | Bartholomew | 267/64.24 |
| 5,109,939 A | * | 5/1992 | Conaway et al. | 180/89.15 |
| 5,299,651 A | | 4/1994 | Wilson | |
| 5,649,692 A | * | 7/1997 | Gilsdorf et al. | 267/64.21 |
| 5,779,009 A | | 7/1998 | Iwasaki | |
| 6,029,764 A | * | 2/2000 | Schubert | 180/89.13 |
| 6,070,681 A | * | 6/2000 | Catanzarite et al. | 180/89.15 |
| 6,073,714 A | * | 6/2000 | McHorse et al. | 180/89.14 |
| 6,181,997 B1 | | 1/2001 | Badenoch et al. | |
| 6,219,602 B1 | | 4/2001 | Badenoch et al. | |
| 6,370,458 B1 | | 4/2002 | Shal et al. | |
| 6,397,134 B1 | | 5/2002 | Shal et al. | |

(Continued)

*Primary Examiner*—Paul N. Dickson
*Assistant Examiner*—Toan C To
(74) *Attorney, Agent, or Firm*—Scott A. McBain

(57) ABSTRACT

A suspension system, typically for use between a cab and an associated truck frame, including a s strut module having a strut, an air spring and a control module. The control module is connected to a source of pressurized air, is integral with the strut and includes a height sensor for sensing a distance between the cab and truck frame. The integral control module selectively pressurizes the air spring in response to changes in that distance. Preferably, the strut is a magnetorheological, McPherson-type strut and the air spring encloses at least a portion of the strut to provide a compact assembly. The strut damping characteristics are varied by the control module to provide optimal ride characteristics. The strut module includes a three-point connection to the cab and frame to resist relative lateral movement between the cab and frame.

26 Claims, 6 Drawing Sheets

U.S. PATENT DOCUMENTS

| | | |
|---|---|---|
| 6,398,198 B1 * | 6/2002 | Okamoto ................. 267/64.27 |
| 6,513,798 B1 * | 2/2003 | Taghizadeh et al. ..... 267/64.27 |
| 6,547,224 B1 | 4/2003 | Jensen et al. |
| 6,592,112 B1 | 7/2003 | Bishop et al. |
| 6,598,932 B1 * | 7/2003 | Gross et al. ........... 296/190.07 |
| 6,633,803 B1 | 10/2003 | Shal et al. |
| 6,726,272 B1 * | 4/2004 | Puterbaugh et al. ... 296/190.01 |
| 6,758,294 B1 * | 7/2004 | Peddycord et al. ...... 180/89.12 |

* cited by examiner

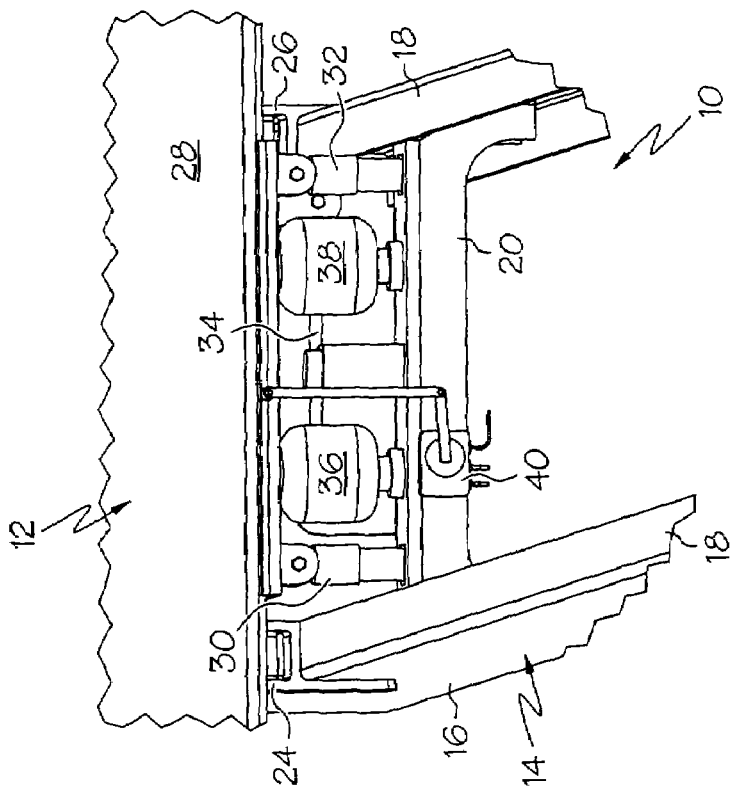
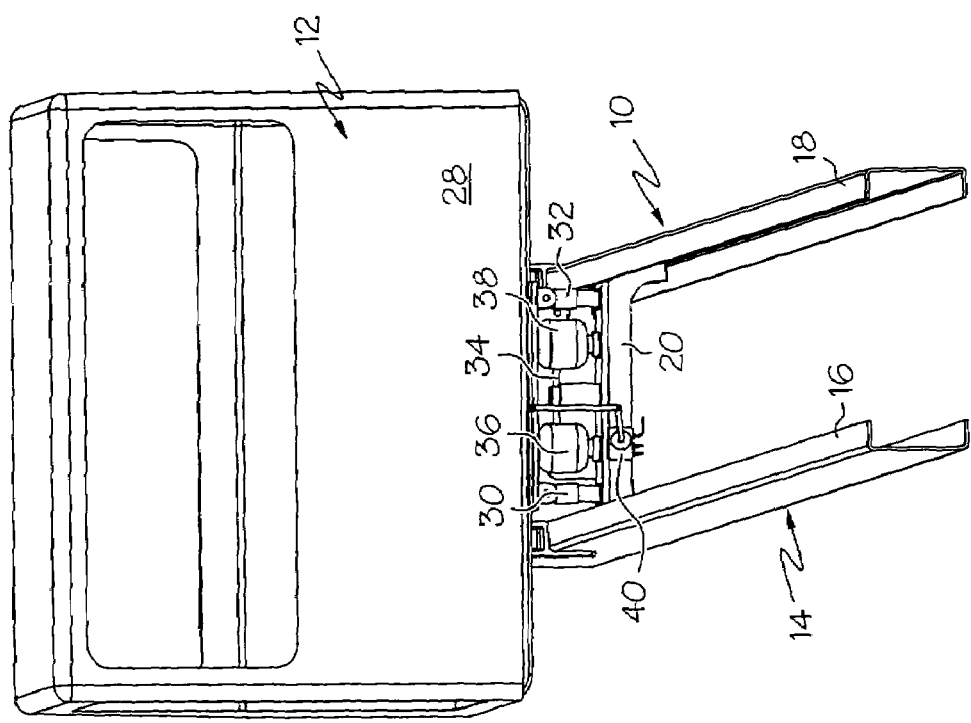
FIG. 1 (PRIOR ART)
FIG. 2 (PRIOR ART)

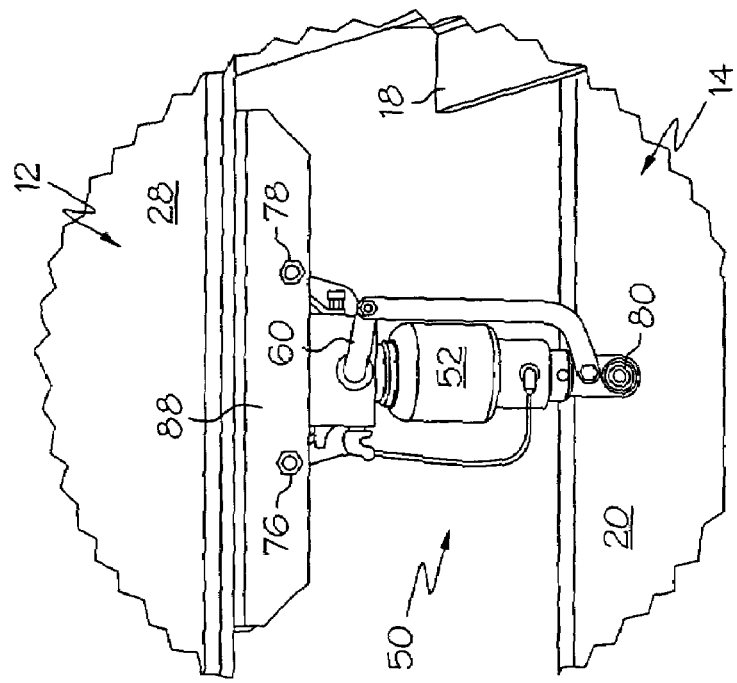
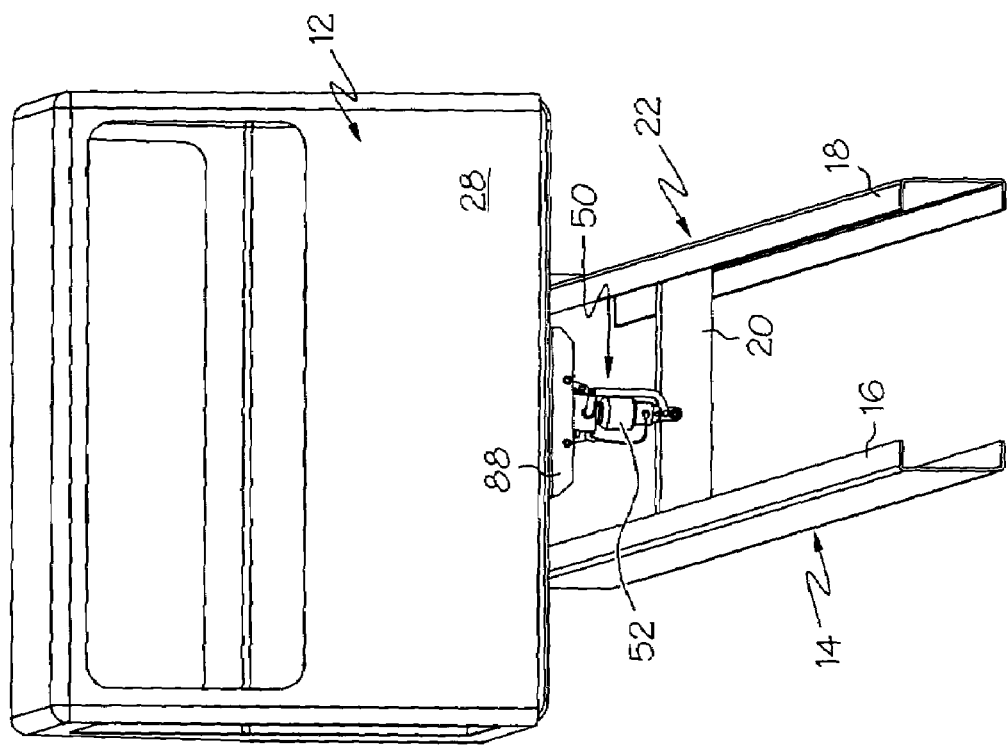
FIG. 6
FIG. 5

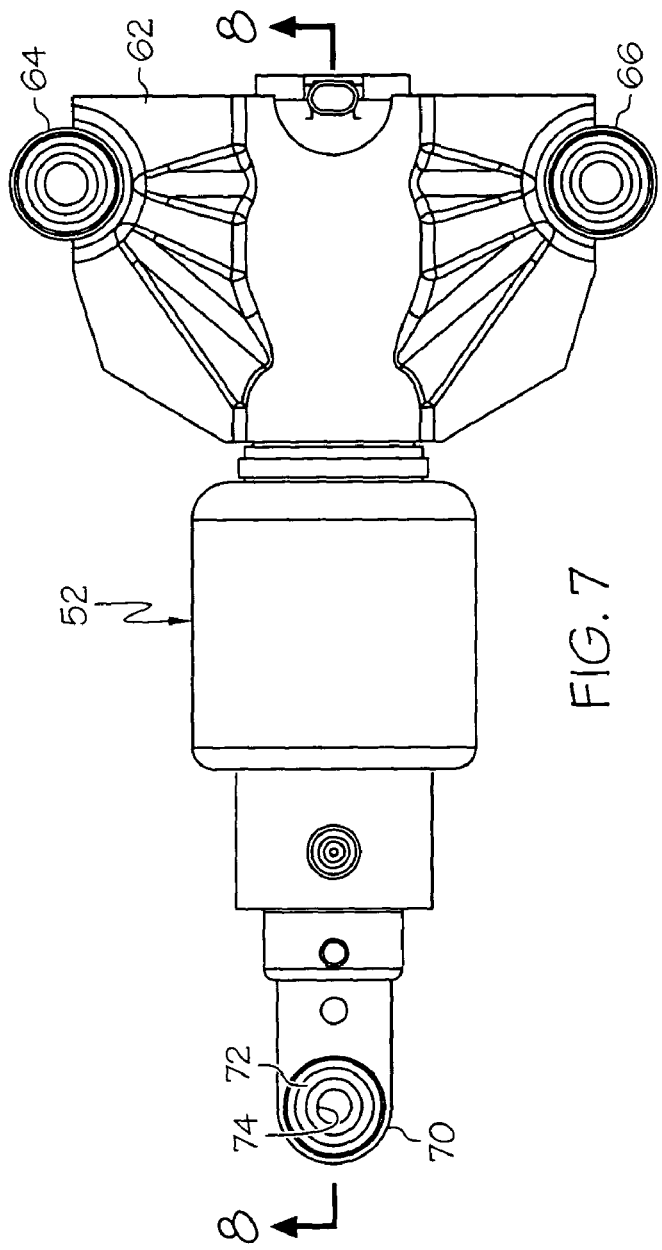
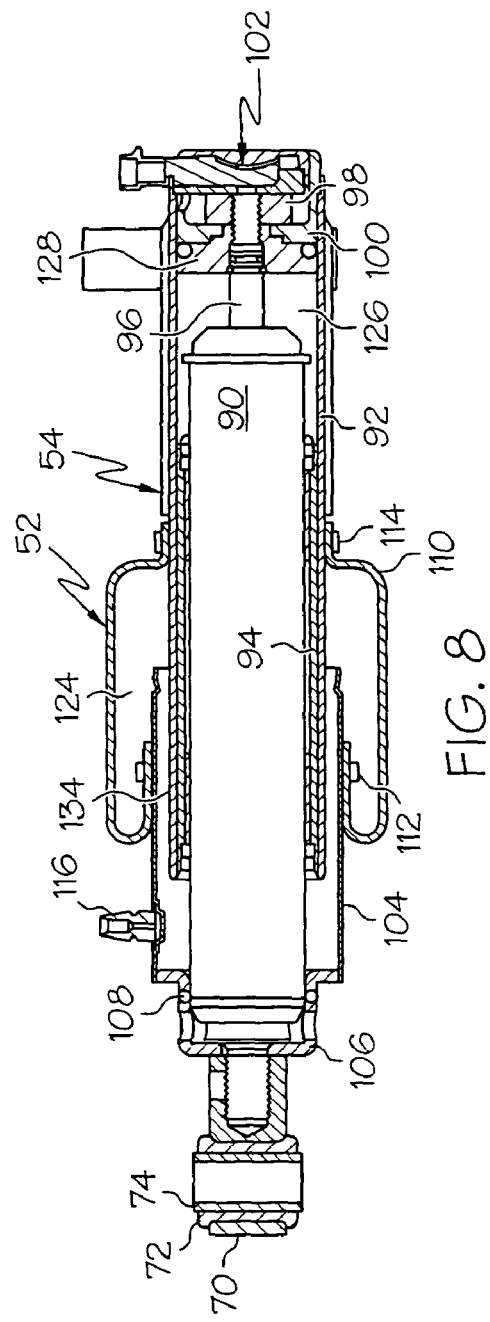
FIG. 7
FIG. 8

CONTROLLED TRUCK CAB SUSPENSION

CROSS REFERENCE TO RELATED APPLICATIONS

The present application claims priority of U.S. Provisional Application No. 60/405,136 filed Aug. 21, 2002, and 60/465,146 filed Apr. 24, 2003.

TECHNICAL FIELD

The present invention relates to the field of suspension systems to isolate vibration and, more particularly, to suspension systems for truck cabs and the like.

BACKGROUND OF THE INVENTION

Medium and heavy-duty trucks and tractors often have a suspension system installed between the truck frame and the driver's cab which reduces shock and vibration transmitted from the frame to the cab and thereby enhances driver comfort. As shown in FIGS. 1, 2 and 3 of the drawings, a typical prior art suspension system, generally designated 10, is adapted to interconnect a truck cab 12 and an associated truck frame 14. The frame 14 typically includes rails 16, 18 joined by a transverse frame element 20. The forward portion 22 of the cab 12 is mounted on the frame 14 by bushings 24, 26. Bushings 24, 26 provide a flexible attachment for the front 22, while controlling relative fore and aft cab movement, as well as restricting lateral movement of the cab 12 relative to the frame 14.

The rear 28 of the cab 12 is attached to the frame 14 by a system that includes standard shock absorbers 30, 32, a panhard rod or transverse link 34, air springs 36, 38, and a height sensor or air control valve 40. The shock absorbers 30, 32 dampen vertical motion between the rear 28 of the cab 12 and the frame 14, and the panhard rod 34 restricts relative lateral motion between the cab and the frame. The air springs 36, 38 support the rear 28 of the cab 12 above the frame 14 and are selectively pressurized by the air control valve 40, which is connected to a source of pressurized air (not shown), in order to maintain the rear 28 of the cab 12 a predetermined distance above the frame 14 in response to varying loads in the cab.

A disadvantage with such prior art systems as the suspension system 10 shown in FIGS. 1–3 is that such systems are overly complex, relatively expensive and occupy a relatively large amount of space beneath the cab and between the rails of the associated frame. Accordingly, there is a need for a suspension system for a truck cab that minimizes the components required to perform the suspension and shock absorbing function, provides lateral support and shock damping features, and at the same time minimizes the space required in the area between the cab and frame rates. There is also a need for a cab suspension system that controls cab ride height and provides an improved ride.

SUMMARY OF THE INVENTION

The present invention is a controlled suspension system, preferably for use between a truck cab and an associated truck frame, that includes a strut module having an air sleeve that is capable of being selectively pressurized, a height sensor for measuring a distance between a truck cab and associated truck frame and a controller for receiving a signal from the height sensor and selectively pressurizing the air sleeve. The strut module is adapted to be mounted between the rear of a truck cab and an associated frame. A signal generated by the height sensor and read by the controller enables the controller to pressurize the air sleeve selectively in order to maintain a predetermined distance between an associated cab and frame to accommodate varying loads within the cab. The strut module also includes a strut, preferably a magnetorheological (MR) McPherson-type strut, that is actuated by the controller to vary the damping characteristics of the strut.

In a preferred embodiment, the controller as well as the height sensor are mounted on and contained within the strut module so that the number of attachment points required by the system of the present invention to an associated cab and frame is minimized. Also in the preferred embodiment, the strut module includes a flange at an end thereof that provides two points of connection of a three-point connection system. This three-point connection system is arranged to restrict relative lateral movement between the cab and frame, thereby eliminating the need of the panhard rod or equivalent structure required by prior art suspension systems, such as that shown in FIGS. 1–3. Another advantage of the preferred embodiment is that the controller controls the MR damper to provide an improved ride over prior art, non-adjustable dampers.

Also in the preferred embodiment, the air sleeve is concentric with and extends about the strut, incorporating the inner and outer strut tubes to define the pressurized chamber of the air sleeve. The resulting strut module is more compact and therefore requires less space than prior art suspension systems. As a result, space between the cab and frame available for other vehicle components is increased.

Other objects and advantages of the present invention will be apparent from the following description, the accompanying drawings and the appended claims.

BRIEF DESCRIPTION OF THE DRAWINGS

FIG. 1 is a schematic, rear perspective view of a vehicle cab and frame showing a prior art suspension system;

FIG. 2 is a detail of the prior art suspension system shown in FIG. 1;

FIG. 5 is a schematic, rear perspective view of a truck cab and frame incorporating the suspension system of FIGS. 4A–4C;

FIG. 6 is a detail of FIG. 5 showing the connection of the suspension system of FIGS. 4A–4C to a truck cab and frame;

FIG. 7 is a side elevational view of the strut module of the present invention;

FIG. 8 is a cross-section taken at line 8–8 of FIG. 7;

DETAILED DESCRIPTION OF THE INVENTION

Figure 3:
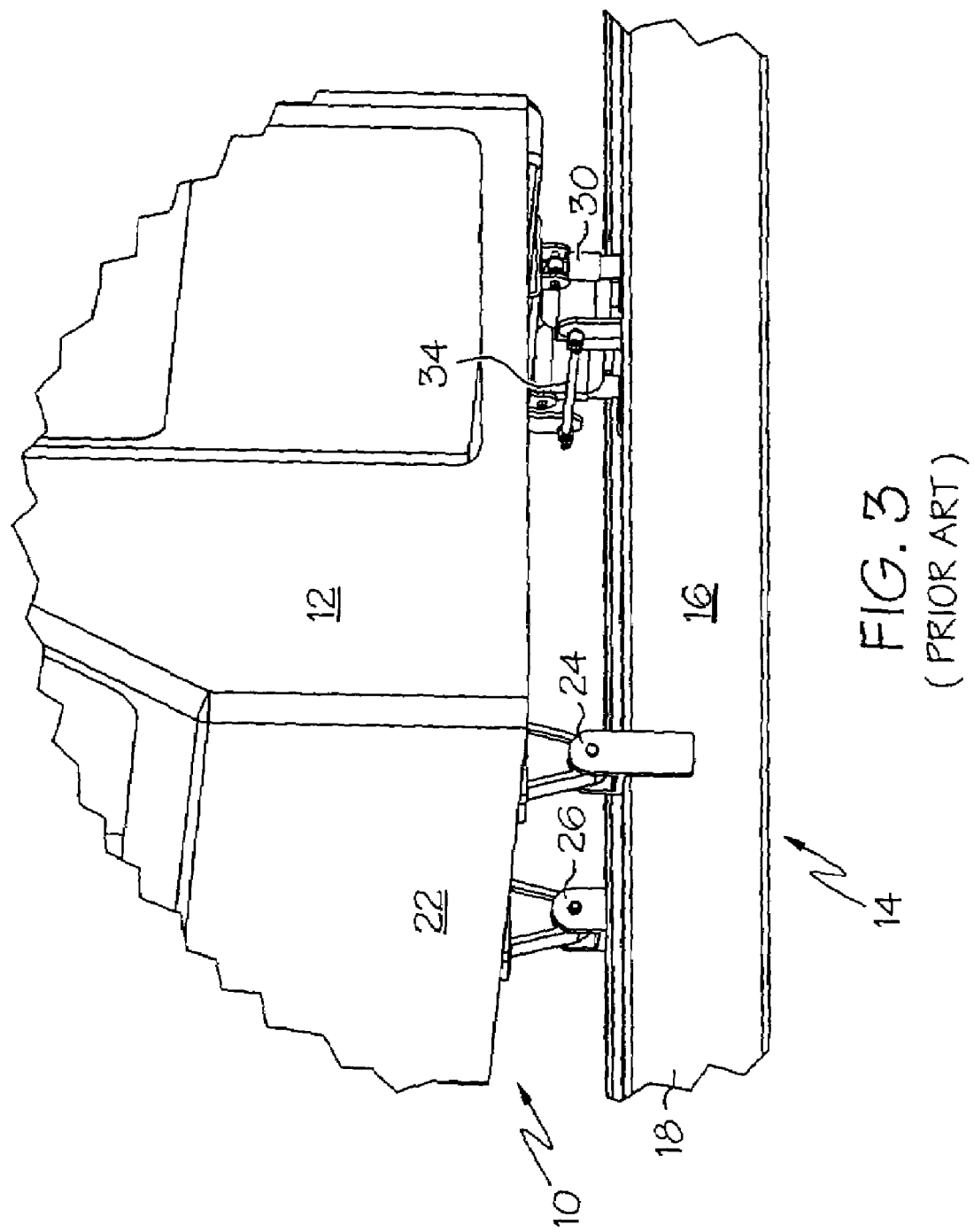
FIG. 3 is a schematic, perspective view of the suspension system of FIG. 1, taken from the side.
Figure 4C:
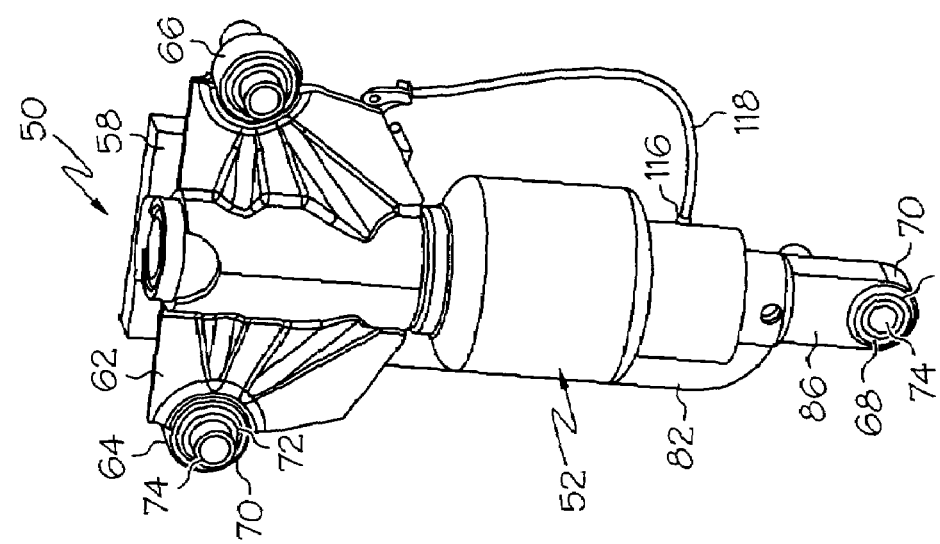
FIGS. 4A, 4B and 4C are perspective views of the suspension system of the present invention.
Figure 4B:
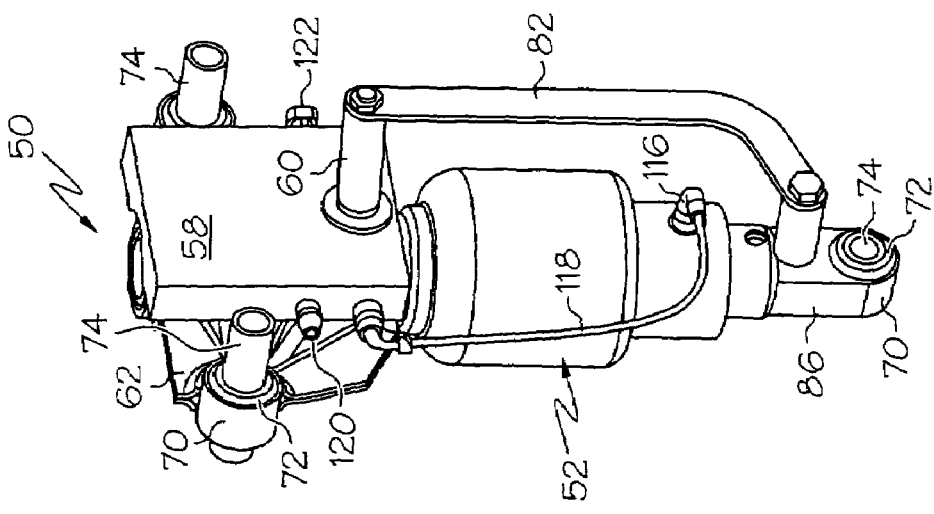
Figure 4A:
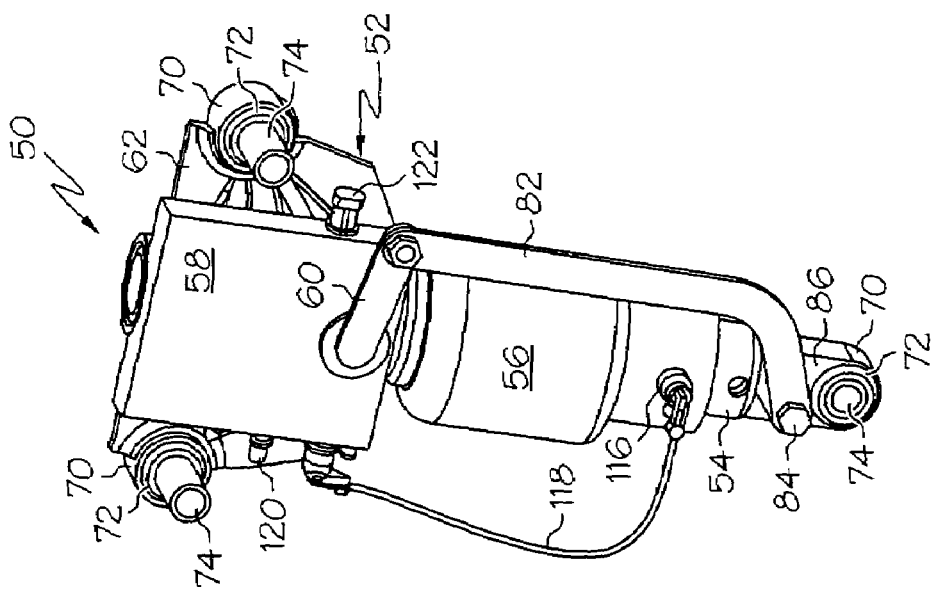

The suspension system of the present invention, generally designated 50, is shown in FIGS. 4A, 4B and 4C. The suspension system 50 includes a strut module 52 that includes a strut 54, air sleeve 56 and a controller 58 of conventional design. Controller 58 is connected to receive a signal from a height sensor 60. The controller 58 preferably is integral with the height sensor 60. The strut module 52 also includes a double flange 62 having resilient connection points 64, 66 spaced on either side of the strut module. Together with connection point 68, connection points 64, 66 constitute a three-point connection between a cab and associated frame. Each of the connection points 64, 66, 68 includes a tubular sleeve 70, resilient bushing 72 and inner, elongated sleeve 74. Each of the connection points 64, 66, 68 is adapted to be attached either to the cab 12 or frame 14 by bolts 76, 78, 80 (see FIG. 6).

The height sensor 60 is of conventional design and includes a link 82 that is connected at an end 84 to the end 86 of the strut 54. As a result, movement of the strut 54 causes the height sensor 60 to detect a change in the spacing between the associated cab 12 and frame 14 (see FIG. 6). Accordingly, there is no need for separate connections between the suspension system 50 and the associated vehicle other than the three-point connections 64, 66, 68 of the strut module 52.

As shown in FIGS. 5 and 6, the strut module 52 is mounted on a flange 88 at its upper end and to the transverse frame element 20 of associated truck frame 14 at its lower end. The flange 88 is, in turn, attached to the rear 28 of the cab 12. As mentioned earlier, the three-point connection 64, 66, 68 provides a resistance to relative lateral movement between the cab 12 and frame 14. The strut module 52 is connected to the flange 88 by bolts 76, 78, and to transverse frame element 20 by bolt 80. Since the height sensor 60 is integral with the strut module 52, there is no need for additional connections between the suspension system 50 and the associated cab 12 and frame 14.

The details of the strut module 52 are shown in FIGS. 7 and 8. The strut module 52 includes a strut 54, which preferably is an MR McPherson-type strut such as that disclosed in U.S. Pat. No. 6,345,706, the disclosure of which is incorporated herein by reference. Strut 54 includes an inner tube 90, an outer tube 92 and a bearing sleeve 94. The bearing sleeve 94 provides an interface between the inner and outer tubes 90, 92, respectively, that distributes bending moments applied to the ends of the strut 54. The inner tube 90 includes an inner rod 96 that is connected to a piston (not shown). The end of the inner rod 96 is treaded and receives a nut 98 and captures a strut base 100. A plug housing 102 is attached to the end of the strut base 100 and is connected to the controller 58 by a cable (not shown).

The air sleeve 52 is shown in FIGS. 7 and 8 and includes a tube 104 connected to an end plate 106 that, in turn, forms a seal with the inner tube 90 by means of a seal element 108, preferably an O-ring. The tube 104 is connected to a flexible sleeve 110 by a retaining ring 112. The flexible sleeve 110 is attached at its opposite end to the outer tube 92 by retaining ring 114. A fitting 116 is connected to a conduit 118 (see FIGS. 4A–4C) that is connected to the controller 58. The controller 58 includes a fitting 120 that connects to a source of pressurized air (not shown) and a fitting 122 that connects to a source of electrical power (not shown).

Figure 10:
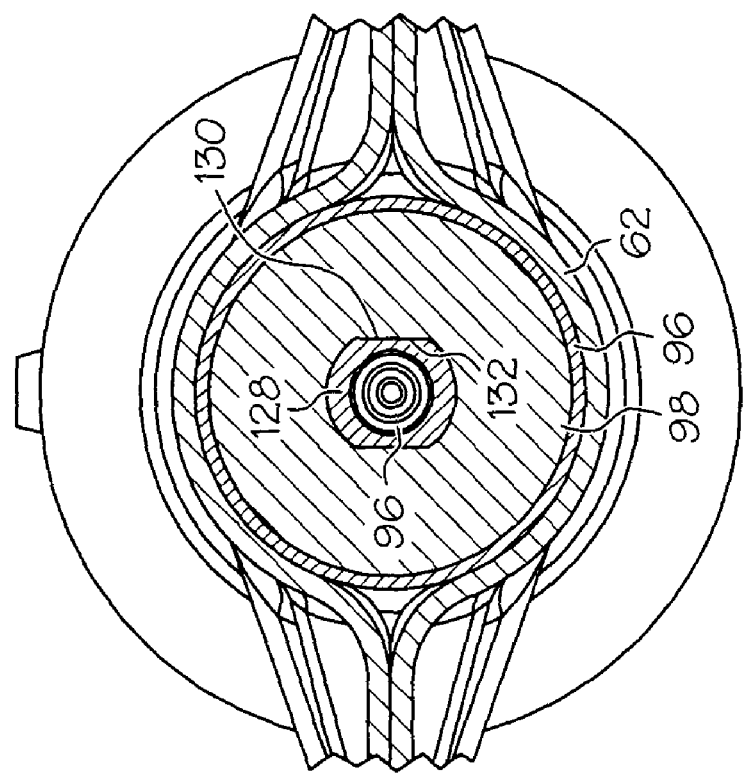
FIG. 10 is a cross-section taken at line 10—10 of FIG. 9.
Figure 9:
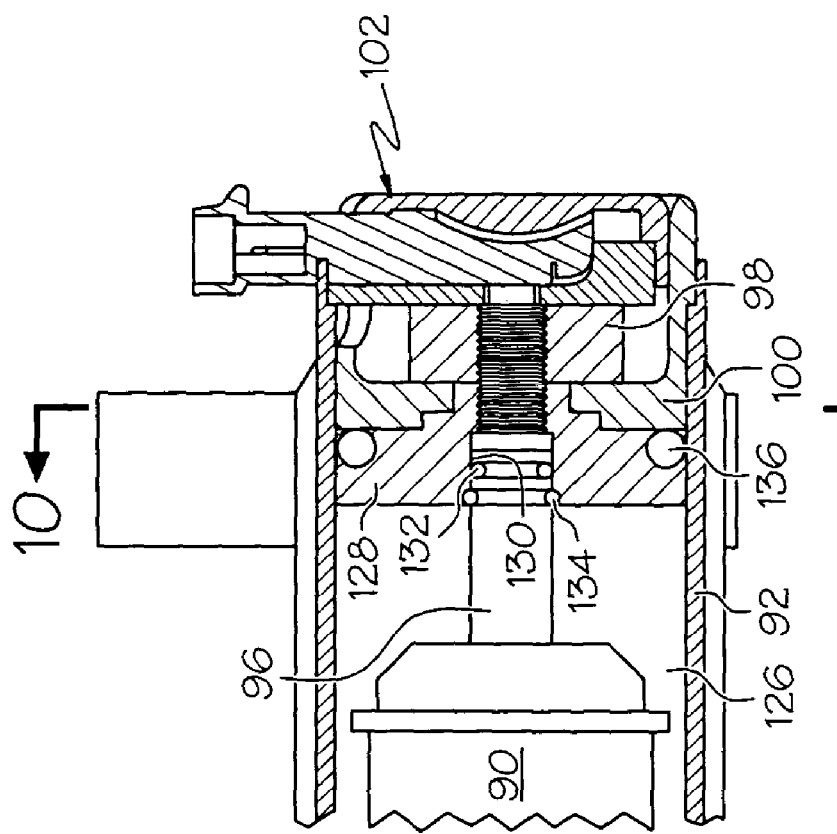
FIG. 9 is a detail side elevation in section of the strut module of FIG. 8.

As shown in FIG. 8, a primary air chamber 124 is formed by inner tube 90, end plate 106, flexible sleeve 110 and outer tube 92. Optionally, a secondary air chamber 126 can be formed, as shown in FIGS. 8, 9 and 10. The secondary air chamber 126 is defined by outer tube 92, inner tube 90 and a seal adapter 128. The seal adapter 128 includes a central hole 130 that receives the end of the inner rod 96 and is shaped to receive a seal element, such as an O22-ring 132, and a retaining ring 134. An O-ring 136 provides a seal between the seal adapter 128 and the outer tube 92. The seal adapter 128 is shaped to engage the strut base 98.

As shown in FIG. 10, the seal adapter 128 includes an anti-rotation projection (shown as flats 130) that mates with corresponding flats 132 formed in the strut base 98. This allows the nut 100 that retains the end of the inner rod 96 to be tightened without rotating the inner rod. Additionally, it may be necessary to provide an air flow groove at 134 (see FIG. 8) to provide a pneumatic connection between primary chamber 124 and secondary chamber 126.

In operation, the relative position between the inner tube 90 and the outer tube 92 of the strut 54 is detected by the height sensor 60, which generates a signal to the controller 58. In response to the signal, the controller 58 pressurizes the primary and secondary air chambers 124, 126, respectively, to maintain the spacing between the cab 12 and frame 14 within predetermined limits. This pressurization would result from a change in the weight or load present in the cab 12. In addition, the controller 58 generates an electrical signal to plug housing 102 that is transmitted through the inner rod 96 to adjust the damping characteristics of the MR strut 54.

While the forms of apparatus described herein constitute preferred embodiments of the invention, it is to be understood that the invention is not limited to these precise forms of apparatus, and that changes may be made therein without departing from the scope of the invention. Furthermore the suspension system 50 of the present invention may be used to support vehicle cabs and other enclosures above both stationary and vehicular support frames, as well as above framework for marine vessels.

What is claimed is:

1. A controlled suspension system for use between a vehicle cab and an associated vehicle frame comprising:
    (a) a strut module adapted to be attached at one end to said cab and at an opposite end to said associated vehicle frame, said strut module including an air sleeve capable of being selectively pressurized, an inner tube, an outer tube concentric with said inner tube, and a bearing sleeve positioned between said inner tube and said outer tube, whereby said bearing sleeve distributes a bending moment applied to the ends of said strut module;
    (b) said strut module including a height sensor for measuring a distance between said cab and said associated frame and generating a signal indicative thereof; and
    (c) a controller for receiving said signal from said height sensor and selectively pressurizing said air sleeve;
    (d) whereby said distance between said cab and said associated frame is maintained within desired limits by selective pressurization of said air sleeve.

2. The suspension system of claim 1 wherein said air sleeve is connected to said inner tube and said outer tube.

3. The suspension system of claim 2 wherein said air sleeve is concentric with said inner tube.

4. The suspension system of claim 3 wherein said air sleeve includes a flexible portion connected to said outer tube.

5. The suspension system of claim 4 wherein said air sleeve includes a relatively rigid portion connected to said inner tube.

6. The suspension system of claim 5 wherein said relatively rigid portion is concentric with said inner tube.

7. The suspension system of claim 1 wherein said strut module includes a mounting flange adapted to make a two-point connection to one of said cab or said frame; and said controller is mounted on said mounting flange.

8. The suspension system of claim 1 wherein said strut module includes a magnetorheological strut and said controller is connected to said magnetorheological strut to vary the damping characteristics thereof.

9. The suspension system of claim 1 wherein said strut module includes a three-point connection adapted to interconnect said cab and said frame, whereby said three-point connection resists relative lateral movement between said cab and said frame.

10. The suspension of claim 1 wherein said frame includes a transverse frame element and said strut module is adapted to be attached thereto.

11. The suspension system of claim 10 wherein said strut module is adapted to be positioned at substantially a midpoint of said transverse frame element.

12. The suspension system of claim 11 wherein said strut module is adapted to be mounted on a downwardly-depending flange of said cab.

13. A controlled suspension system for use between a vehicle cab and an associated vehicle frame comprising:
  (a) a strut module adapted to be attached at one end to said vehicle cab and at an opposite end to said associated vehicle frame, said strut module including an air sleeve capable of being selectively pressurized, a strut having an inner tube, an outer tube concentric with said inner tube, and a bearing sleeve positioned between said inner tube and said outer tube, whereby said bearing sleeve distributes a bending moment applied to the ends of said strut, and wherein said air sleeve includes a flexible portion connected to said outer tube and a relatively rigid portion connected to said inner tube, wherein said relatively rigid portion, said flexible portion, said inner tube and said outer tube define a first air chamber of said air sleeve and said air sleeve includes a seal adapter that, together with said inner tube and said outer tube, defines a second air chamber;
  (b) said strut module including a height sensor for measuring a distance between said cab and said associated frame and generating a signal indicative thereof; and
  (c) a controller for receiving said signal from said height sensor and selectively pressurizing said air sleeve;
  (d) whereby said distance between said cab and said associated frame is maintained within desired limits by selective pressurization of said air sleeve.

14. A controlled suspension system for use between a vehicle cab and an associated vehicle frame comprising:
  (a) a strut module adapted to be attached at one end to said cab and at an opposite end to said associated frame, said strut module including a three-point connection adapted to interconnect said cab and said frame, whereby said three-point connection resists relative lateral movement between said cab and said frame;
  (b) said strut module having an inner tube and an outer tube concentric with said inner tube and being shaped to form a slidable connection with said inner tube such that bending moments applied to ends of said strut module are resisted by and transmitted through said slidable connection between said inner tube and said outer tube;
  (c) a height sensor mounted on said strut module for measuring a distance between said cab and said frame and generating a signal indicative thereof; and
  (d) a controller mounted on said strut module for receiving said signal from said height sensor and selectively pressurizing said strut module;
  (e) whereby said distance between said cab and said associated frame is maintained within desired limits by selective pressurization of said strut module by said controller.

15. The suspension system of claim 14 wherein said frame includes a transverse frame element and said strut module is adapted to be attached thereto.

16. The suspension system of claim 15 wherein said strut module includes a mounting flange adjacent one end thereof; said mounting flange having a two-point connection; said two-point connection being a component of said three-point connection.

17. The suspension system of claim 16 wherein said two-point connection is adapted to be attached to one of said cab and said frame.

18. The suspension system of claim 14 wherein said controller is mounted on said strut module.

19. The suspension system of claim 14 wherein said strut module includes a magnetorheological strut and said controller is connected to said magnetorheological strut to vary the damping characteristics thereof.

20. The suspension system of claim 14 wherein said height sensor is integral with said controller.

21. A controlled suspension system for use between a vehicle cab and an associated vehicle frame comprising:
  (a) a strut module adapted to be attached at one end to a vehicle cab and at an opposite end to an associated vehicle frame;
  (b) said strut module including a height sensor for measuring a distance between said cab and said associated frame and generating a signal indicative thereof;
  (c) a controller for receiving said signal from said height sensor and selectively pressurizing said air sleeve;
  (d) whereby said distance between said cab and said associated frame is maintained within desired limits by selective pressurization of said air sleeve; and
  (e) said strut module including a mounting flange adapted to make a two-point connection to one of said cab or said frame and said controller is mounted on said mounting flange, and wherein said strut module includes a housing mounted on said mounting flange, and said housing encloses said controller and said height sensor.

22. The suspension system of claim 21 wherein said height sensor includes a link connected to said strut module adjacent an end opposite said mounting flange.

23. The suspension system of claim 21 wherein said end opposite said mounting flange is adapted to make a single point connection that, together with said two-point connection, makes a three-point connection between said cab and said frame, thereby resisting relative lateral movement between said cab and said frame.

24. A controlled suspension system for use between a vehicle cab and an associated vehicle frame comprising:
  (a) a strut module adapted to be attached at one end to a vehicle cab and at an opposite end to an associated frame, said strut module including a three-point connection adapted to interconnect said cab and said frame, whereby said three-point connection resists relative lateral movement between said cab and said frame;

(b) a height sensor mounted on said strut module for measuring a distance between said cab and said frame and generating a signal indicative thereof;
(c) a controller for receiving said signal from said height sensor and selectively pressurizing said strut module; and
(d) said strut module including a housing containing said controller and said height sensor;
(e) whereby said distance between said cab and said associated frame is maintained within desired limits by selective pressurization of said strut module by said controller.

25. The suspension system of claim 24 wherein said housing is positioned adjacent an end of said strut module; and said height sensor includes a link extending from said housing and attached adjacent to an opposite end of said strut module.

26. The suspension system of claim 24 wherein said strut module includes a strut having an inner tube, an outer tube and a bearing sleeve interconnecting said inner and outer tubes; and said link is attached to said inner tube.

* * * * *